United States Patent [19]

Minh et al.

[11] Patent Number: 5,368,667
[45] Date of Patent: Nov. 29, 1994

[54] PREPARATION OF DEVICES THAT INCLUDE A THIN CERAMIC LAYER

[75] Inventors: Nguyen Q. Minh, Fountain Valley; Craig R. Horne, Manhattan Beach; James V. Guiheen, Hermosa Beach, all of Calif.

[73] Assignee: AlliedSignal Inc., Morris Township, Morris County, N.J.

[21] Appl. No.: 11,052

[22] Filed: Jan. 29, 1993

[51] Int. Cl.⁵ .............................................. B32B 18/00
[52] U.S. Cl. ........................................ 156/89; 156/182; 156/242; 264/61; 419/10; 419/38; 419/69
[58] Field of Search .......................... 156/89, 182, 242; 29/25.03, 25.42; 264/60, 61, 62, 175; 419/10, 38, 69

[56] References Cited

U.S. PATENT DOCUMENTS

| | | | |
|---|---|---|---|
| 2,371,353 | 3/1945 | Parsons | 25/156 |
| 2,966,719 | 1/1961 | Park, Jr. | 25/156 |
| 3,991,149 | 11/1976 | Hurwitt | 264/63 |
| 4,752,857 | 6/1988 | Khoury et al. | 361/321 |
| 4,816,036 | 3/1989 | Kotchick | 29/623.3 |
| 4,913,982 | 4/1990 | Kotchick et al. | 429/12 |
| 5,053,294 | 10/1991 | Sernka et al. | 429/104 |

OTHER PUBLICATIONS

R. Gibson et al., "Advances in MSOFC Systems and Technology," Presented at EPRI/GRI Fuel Cell Workshop, pp. 1-34 (Apr. 29, 1992).

Primary Examiner—Jan H. Silbaugh
Assistant Examiner—Christopher A. Fiorilla
Attorney, Agent, or Firm—Robert A. Walsh

[57] ABSTRACT

A device having a thin ceramic layer therein, is made by preparing a mixture of ceramic particles, a binder, and a plasticizer, and forming the mixture into a ceramic layer. A second layer is placed adjacent to the ceramic layer to form a composite layered structure. The thickness of the composite layered structure is reduced, preferably by rolling, until the ceramic layer portion of the composite layered structure has a preselected small thickness. If desired, the thickness of the ceramic layer can be reduced to an arbitrarily small value by stacking the reduced composite layered structures (or one of the layered structures with another structure) and repeating the reducing operation on the stack. The ceramic layer having the preselected thickness is assembled into a device. Devices that can be prepared by this approach include, for example, multilayer capacitors, solid oxide fuel cells, and solid-electrolyte electrochemical storage cells.

7 Claims, 4 Drawing Sheets

PREPARATION OF DEVICES THAT INCLUDE A THIN CERAMIC LAYER

BACKGROUND OF THE INVENTION

This invention relates to the manufacture of devices that include a ceramic layer, and, more particularly, to a reliable, inexpensive approach for preparing such a device with a very thin ceramic layer.

Ceramics are used in a wide variety of devices because of their unique properties. For example, many ceramics have low electrical conductivity and are therefore useful as dielectric insulators in devices such as capacitors and microelectronic devices. Other ceramics having high ionic conductivity can act as solid electrolytes in applications such as fuel cells and electrochemical storage cells.

In such devices, the ceramic is generally present as a thin layer between or adjacent to electrical conductors or electrodes. The operating principles of such devices, as well as the general need in many devices to improve performance and reduce weight and space requirements, dictate that the ceramic layer should be made as thin as possible consistent with other physical requirements such as sufficient strength and an absence of defects such as pinholes through the ceramic layer.

There are two types of approaches for preparing thin ceramic layers for use in such devices, powder-based techniques and direct deposition techniques. In the powder-based approach, the ceramic is furnished as a powder which is suspended in a fluid or mixed with a binder and a plasticizer. The fluid or binder/plasticizer aid in the handling and forming of the ceramic particles. The flowable mixture is formed into the required shape, the fluid or binder/plasticizer is removed by heating, and the solid ceramic is sintered to its final density. At present, the powder-based techniques of this type have been used to produce layers of about 25 micrometers (0.001 inch) or more in thickness.

In the direct deposition approach, a layer of ceramic is deposited from a bulk or gaseous source onto a substrate by a transport process such as physical vapor deposition or chemical vapor deposition. These direct deposition techniques can produce arbitrarily thin ceramic layers, down to the atomic thickness range in some cases. However, they are usually slow and difficult to implement in many production operations because they require complex deposition apparatus and often require line-of-sight to the deposition region from the source of the ceramic. These techniques may also be limited as to the compositions and degrees of porosity that can be prepared.

A number of devices such as capacitors, solid oxide fuel cells, and solid electrolyte electrochemical storage cells are commonly manufactured using ceramic layers made by conventional powder-based techniques. In general, currently the thickness of the ceramic layers made by those techniques is about 25 micrometers. Direct deposition techniques are also used in some cases, but they are too slow and costly for most applications. Such devices would benefit from the ability to economically manufacture them with thinner ceramic layers, on the order of 10 micrometers in thickness or less. There is therefore a need for an improved approach by which devices having thin ceramic layers can be fabricated.

SUMMARY OF THE INVENTION

The present invention provides a method for producing a thin ceramic layer, a method for preparing devices having a thin ceramic layer, and the layers and devices made according to these methods. This approach is highly economical, because it manufactures the thin ceramic layer in quantity. In some cases, the approach can be used to fabricate a subassembly of the final device integral with other portions of the device, further reducing other device manufacture and assembly costs. The approach can be used to prepare ceramic layers as thin as about 1 micrometer, and even thinner in some instances depending upon the availability of materials. Such thin ceramic layers improve device performance and reduce the weight and volume of the device.

In accordance with the invention, a method for preparing a device having a thin ceramic layer therein comprises the steps of preparing a mixture of ceramic particles, a binder, and a plasticizer, and forming the mixture into a ceramic layer, which is, at this point, relatively thick. The method further includes placing a second layer adjacent to the ceramic layer to form a composite layered structure and reducing the thickness of the composite layered structure until the ceramic layer portion of the composite layered structure has a preselected small thickness. The ceramic layer having the preselected thickness, and in some cases with the second layer remaining in contact, is thereafter assembled into a device.

This technique preferably utilizes a rolling technique for reducing the thickness of the composite layered structure, so that the structure is effectively an elongated tape. The ceramic-containing layer is rendered plastically deformable by the presence of the binder and plasticizer. It may be passed between a pair of rollers spaced closer together than the current thickness of the composite layered structure, to reduce its thickness by the amount of the roll bite. When the thickness of the composite layered structure is thereby reduced, the thickness of the plastically deformable ceramic-containing layer is also reduced. The ceramic-containing layer may be passed through a series of roll pairs to progressively reduce its thickness. The second layer is normally selected to be similarly deformable, so that it becomes thinner during the thickness reduction in a compatible fashion. This co-reduction in the adjacent layers helps to ensure that the ceramic-containing layer is not fractured during the process. Depending upon the ultimate application, it is possible in many cases to select the second layer so that it is part of the final device. In other cases, the second layer is separated from the ceramic layer prior to the use of the ceramic layer in the device.

It is more difficult to reduce thin structures than thick structures by rolling or other reduction procedures. When the composite layered structure becomes so thin during progressive reduction that further reduction in that form is not practical, further reductions may be achieved by stacking the composite layered structure with other layers to make the total thickness of the stack sufficient to permit further reduction. The thickness of the stack, and thence the ceramic layer, is further reduced.

After the ceramic-containing layer is reduced to the desired thickness, which is typically in the range of about 1–10 micrometers, it is assembled with the other components of the device. As indicated, in some instances the co-reduced layer or layers may be selected to be part of the device itself, so that the ceramic from the layer need not be separated from the co-reduced layers during assembly. In other instances, such a separation is required during assembly.

At some point, either prior to or after assembly, the ceramic-containing layer is heated to remove the binder and plasticizer by vaporization or decomposition of these components. The remaining ceramic particulate is heated to a sufficiently high temperature to cause it to sinter to a continuous structure, which may be fully dense or may have a controllable porosity, depending upon the requirements of the device.

The present approach is quite flexible, and may be used to make a wide variety of devices. It utilizes as a starting material ceramic powders, which are available in many forms and compositions. The present approach is therefore not limited by the availability of direct deposition techniques for a particular ceramic material. The present approach is also economical, as large amounts of the ceramic-containing layers may be made relatively quickly by rolling techniques. Other features and advantages of the present invention will be apparent from the following more detailed description of the preferred embodiment, taken in conjunction with the accompanying drawings, which illustrate, by way of example, the principles of the invention.

DETAILED DESCRIPTION OF THE INVENTION

Figure 1:
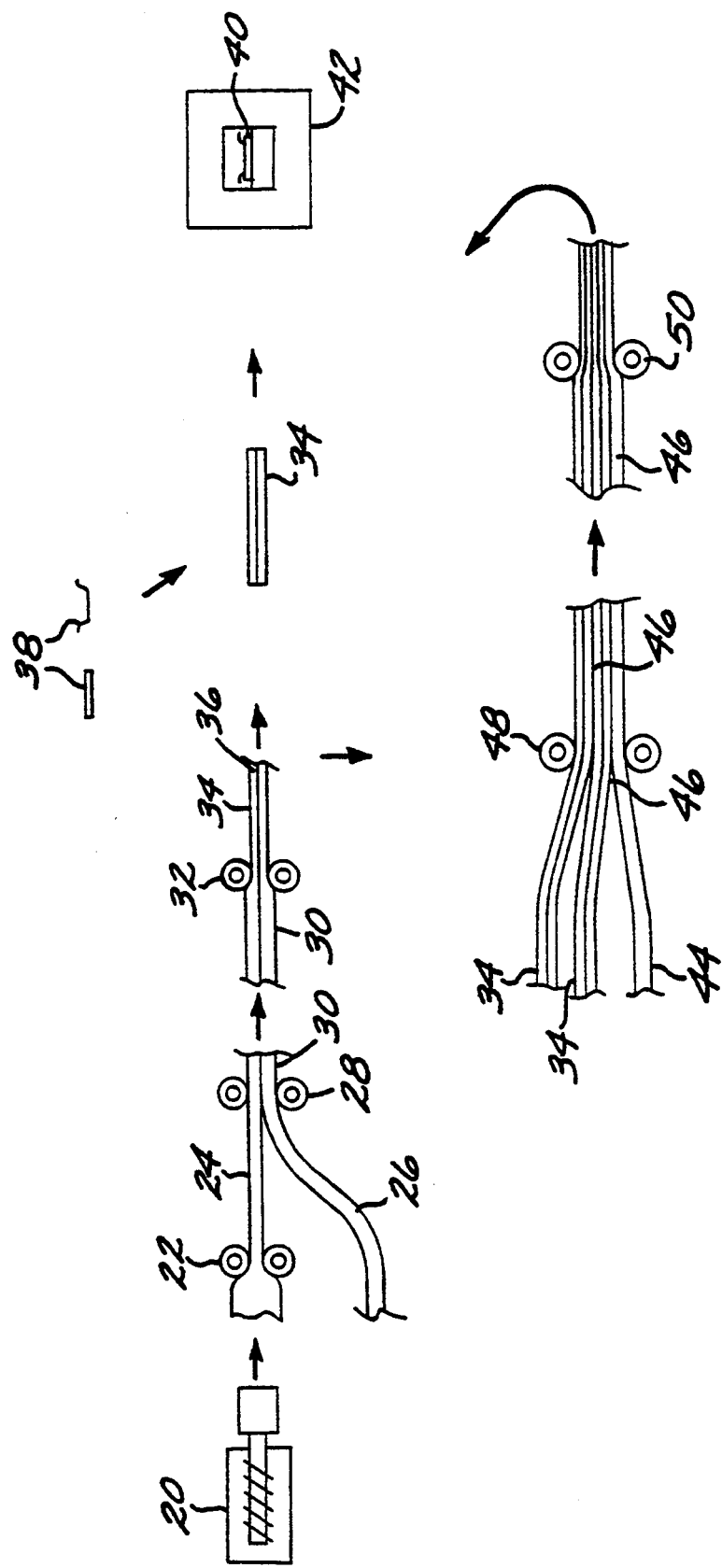
FIG. 1 is a pictorial process flow diagram for the approach of the invention.

The procedure of the invention is depicted in FIG. 1. A mixture of a ceramic powder, a binder, and a plasticizer is first prepared in a high-intensity mixer 20. The ceramic powder may be any composition or mixture of compositions required for the ceramic layer of the final device. The ceramic powders may include, for example, oxides, nitrides, carbides, silicides, borides, chromites, perovskites, and titanates. This listing is not intended to be exhaustive, but simply illustrative of the wide range of types of ceramics that may be utilized. The ceramic is in the form of a particulate or powder. The powder size must be smaller than the thickness of the ceramic layer at the conclusion of processing and in the device, because the ceramic powder itself does not deform during processing. Thus, for example, if the ceramic layer is ultimately to be 3 micrometers in thickness, most of the ceramic particles are preferred to be less than 3 micrometers in diameter. Ceramic powders are available in sizes down to about 0.1 micrometer diameter or smaller in some cases. If some degree of porosity is desired in the final ceramic layer, different sizes of particles in the powder to control sinterability may be used, but in any event even the larger particles must be smaller than the final preselected thickness of the ceramic layer. Otherwise, no absolute limit on ceramic powder size can be stated.

Binders and plasticizers are known in the art, and types and amounts appropriate to the specific processing are selected. The binder maintains the ceramic powder in a single coherent mass so that it may be worked during processing. The binder is a thermoplastic resin and qualitatively should possess the following properties: (i) confer plasticity upon the ceramic powder mixture sufficient for rolling, (ii) wet the powder to aid dispersion and minimize entrapped gas, (iii) show stability under mixing and rolling conditions, (iv) impart adequate tear strength to the structure during forming, (v) leave a minimal amount of residue after extraction, and (vi) have an adequate storage life. Examples of binders include synthetic rubber, thermoplastics, polyvinyl alcohol, or polymer systems which thermally decompose without cross-linking.

The plasticizer allows the mixture of ceramic powder, binder, and plasticizer to be worked and reduced at ambient temperature. The plasticizer is an organic additive whose function is to increase the plasticity of the ceramic-binder mixture. The plasticizer should have compatibility with the binder and low volatility. Examples of plasticizers include glycol and phthalate groups.

The amounts of ceramic powder, binder, and plasticizer are selected to permit the subsequent processing. Preferably, the binder is from about 10 to about 40 percent by volume of the mixture, the plasticizer is from about 10 to about 40 percent by volume of the mixture, and the remainder of the mixture is the ceramic powder. The selected amounts of binder and plasticizer depend upon the characteristics of the ceramic powder. Powders with small particle sizes have high surface areas. Thus, high binder and plasticizer content is required to coat each small particle to provide formability of the mixture. Low binder and plasticizer content produces less flexible tapes, leading to difficulty in rolling and laminating.

The ceramic powder, binder, and plasticizer are combined in the high intensity mixer 20 at ambient temperature. The mixing disperses the powder particles throughout the mixture and coats them with binder and plasticizer. The mixing action heats the mixture up to about 150C, and softens the binder. Typically, the time for mixing is from about ½ to about 10, preferably about 2, minutes.

The mixture is removed from the mixer 20 and formed into a layer, as by rolling, milling, or pressing. In the preferred and illustrated approach, the mixture is fed between two counterrotating rollers 22 in a rolling mill. Each roller 22 of the rolling mill is preferably heated to about 10–150C to assist in the rolling and deforming of the mixture. The gap between the rollers 22 defines the thickness of a layer of the mixture of ceramic particles, binder, and plasticizer that emerges, in this case as a ceramic-containing tape 24. The thickness of the tape 24 is typically from about 75 to about 750 micrometers. It is not possible to produce a tape 24 at this stage having a thickness of less than about 25 micrometers.

The ceramic-containing tape 24 is contacted with a second layer or tape 26. The second tape 26 is selected appropriately for the requirements of the final device. The second tape 25 could be of a structure and type that co-deforms with the tape 24 during subsequent processing, or it could be an inert, non-deformable character. In the first category, the second tape 26 could be, for example, another ceramic-containing tape of a different ceramic composition than the tape 24. The tape 26 could also be a deformable tape of metallic powders, binder, and plasticizer. The tape 26 could be a sacrificial material such as a polymer that vaporizes and burns away during subsequent heating. In the second category, the tape 26 could be a metallic foil or a release material such as wax paper.

The ceramic-containing tape 24 and the tape 26 are preferably laminated together by passing them between a pair of rollers 28 in a rolling mill to form a composite layered structure 30. The thicknesses of the tapes 24 and 26 are not substantially reduced during this laminating step.

The thickness of the composite layered structure 30 is reduced by passing the composite layered structure 30 between two rollers 32 whose surface-to-surface is separation less than the current thickness of the composite layered structure 30. The rollers 32 are preferably heated slightly, as described previously for the rollers 22. The result of passing the composite layered structure 30 between the rollers 32 is a reduced-thickness composite layered structure 34, wherein a ceramic-containing layer 36 has a thickness less than that of the original ceramic-containing tape 24 of the composite layered structure 30.

FIG. 1 illustrates a single pair of rollers 32. However, in many instances the composite layered structure 30 will be passed through several pairs of rollers, with each successive pair of rollers being more closely spaced than the prior pair. As a practical matter, it is found that the reduction in thickness of the composite layered structure as it passes between each pair of rollers 32 cannot be arbitrarily large, and is preferably limited to no more than about 50 percent reduction in thickness per pair of rollers. If the reduction per pass is too large, the ceramic-containing layers 24 and 36 in the composite structures may be damaged.

The ceramic-containing layer 36 of reduced thickness is now assembled together with other components 38 to form a device 40. In forming the device, the tape 26 may in some cases be incorporated into the device, and in other cases removed during the assembly process. Assembly may be a complex operation, but is illustrated generally in FIG. 1. Examples of several approaches will be presented subsequently.

Either before assembly, or after assembly as shown in FIG. 1, the ceramic-containing tape 35 is placed into a furnace 42. The furnace 42 is heated to a temperature sufficient to cause the binder and the plasticizer to vaporize and leave the ceramic-containing layer 36 (and the second tape if applicable), a stage termed binder extraction. The temperature of the furnace is thereafter increased to cause the ceramic particles remaining in the tape 36 to sinter together to form a solid ceramic piece.

The atmospheres, temperatures, times, heating rates, and cooling rates during the extraction of binder and plasticizer and during sintering will depend upon the particular components chosen and the desired final structure. In a typical case, however, a vacuum or inert atmosphere is applied during the extraction process and the sintering is performed in air or a controlled atmosphere to prevent escape of components of the ceramic. Typical heating rates are from about 0.1 to about 2 degrees C per minute to an extraction temperature of 200–500C. The vaporized binder and plasticizer diffuse out of the tape 36 and are drawn away. As the binder and plasticizer are extracted, the tape 36 ordinarily shrinks by about 5–10 percent by volume.

After extraction is complete, the layer 36 is heated to the sintering temperature. The heating rate and sintering temperature vary according to the type of ceramic. The heating rate is typically about 0.3 to about 3 degrees C per minute. The sintering temperature is typically about 1400C, but, as indicated, may vary according to the nature of the ceramic powders being sintered. The final density of the layer 36 may also be controlled by varying the sintering temperature, sintering time, and particle mix in the layer 35.

After sintering, the layer 36 (and device 40) are cooled to ambient temperature. Any further required assembly is completed.

In some instances, the pair of rollers 32, or even a series of pairs of rollers 32, may not be able to reduce the thickness of the ceramic-containing layer 36 by the desired amount. A stacking procedure to increase the amount of reduction that may be attained is shown in FIG. 1. In the illustrated version of the stacking procedure, the reduced-thickness composite layered structure 34 (produced by passage of the composite layered structure 30 through the rollers 32) is stacked together with other layers. The other layers may be other portions of the reduced-thickness composite layered structure 34, other tapes 44, or both, as illustrated. The other tapes 44 may be other ceramic-containing tapes, metal powder-containing tapes, inert materials, or the like. The tapes form a stack 46. The stack 46 may be passed between a pair of rollers 48 to laminate the tapes together, without any substantial reduction in thickness of the stack. The stack 46 is passed between two rollers 50, or a series of pairs of rollers, that reduce the thickness of the stack 46 in the manner discussed previously in relation to the rollers 32. By performing the stacking process, and repeating it if necessary, the thickness of any particular ceramic-containing layer 24 or 36 may be reduced to preselected small values. The resulting reduced-thickness layer, or the stack of reduced thickness, is used in the assembly of the device 40.

Three specific applications of the invention are currently of most interest. These applications, a multilayer capacitor, a solid oxide fuel cell, and a solid electrolyte electrochemical cell, will be described subsequently. In this discussion, the portions of the process already described in detail in reference to FIG. 2 will be described briefly, with the more comprehensive discussion incorporated by reference.

Figure 2:
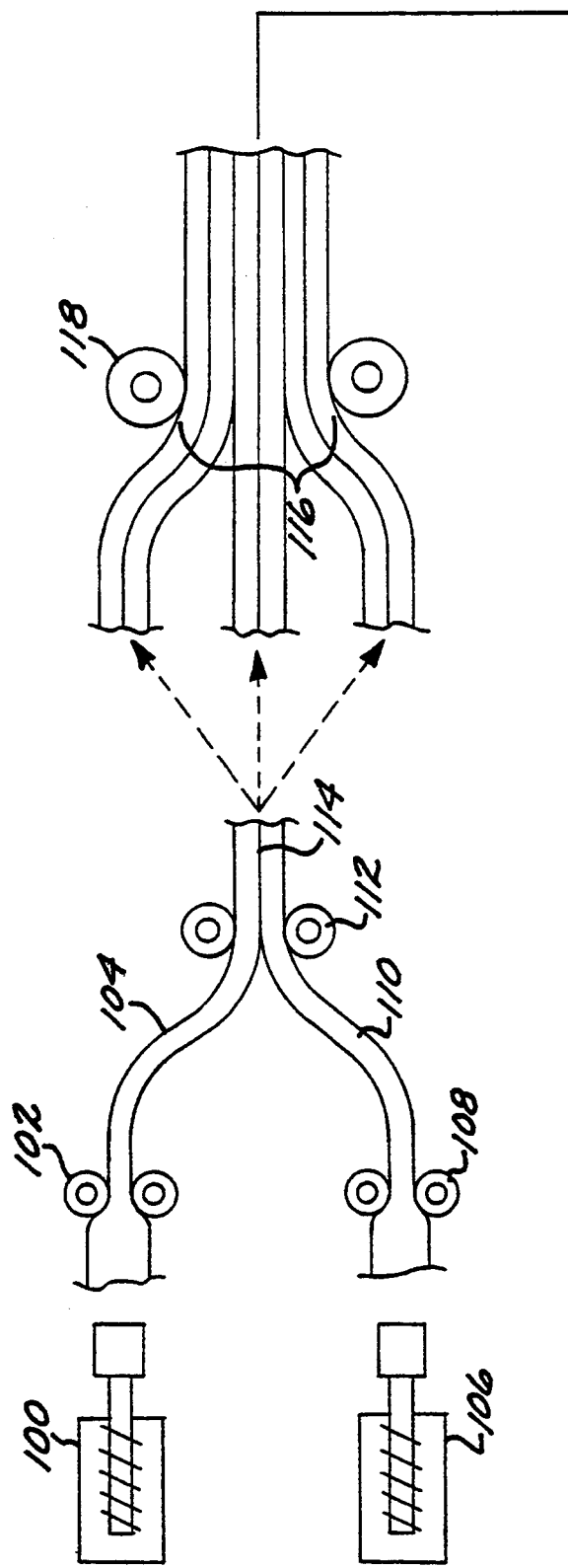
FIG. 2 is a pictorial process flow diagram for the use of the approach of the invention to prepare a multilayer capacitor.
Figure 2:
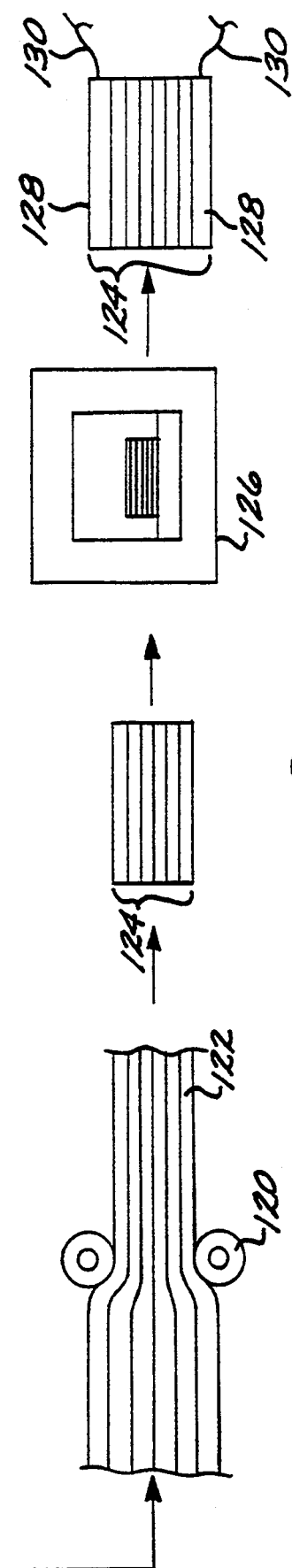

FIG. 2 illustrates the preferred approach for the fabrication of a multilayer capacitor. A mixture of particles of ceramic powder, preferably barium titanate, about 20–30 volume percent of binder, and about 20–30 volume percent of plasticizer, is prepared in a mixer 100. The mixture is passed between a pair of rollers 102 to form a ceramic-containing tape 104. In a second mixer 106, a mixture of particles of a metallic powder, preferably palladium or a silver-palladium alloy, about 20–30 volume percent of binder, and about 20–30 volume percent of plasticizer, is prepared. The mixture is passed between a pair of rollers 108 to form a metal-containing tape 110. The tapes 104 and 110 may be of the same or different thicknesses.

The tapes 104 and 110 are laminated together by passing them between two rollers 112, producing a composite tape 114. The rollers 112 may reduce the thicknesses of the individual tapes 104 and 110 to a certain extent, depending upon the final thicknesses required.

The composite tape 114 is cut into lengths, which are stacked one on top of the other to produce a stack 116. The individual tapes 114 of the stack 116 are laminated together by passing the stack 116 between two rollers 118 which may reduce the thicknesses of the individual tapes 114 to a certain extent, depending upon the final thicknesses required.

The laminated stack 115 is passed between two rollers 120, or a series of rollers, whose spacing is less than the thickness of the stack 116. The thickness of the stack 116 is reduced either in one pass or a series of passes, producing a reduced thickness stack 122. Since both of the tapes 104 and 110 are plastically deformable and have similar mechanical properties in the green state due to the polymer matrix, they each reduce in thickness proportionally to the reduction in the thickness of the stack. The stacking, laminating, and rolling steps may be repeated as many times as necessary, and with various stacked elements as necessary, in order to reduce the thickness dimension of the ceramic-containing tape or layer 104 to the desired dimension. The stacked elements may be laminates that were previously reduced, tapes, or other planar structures that might be desired in the capacitor. In the preferred approach, the final dimension of the ceramic-containing tape 104, which becomes the dielectric of the capacitor, is about 1-2 micrometers.

The reduced-thickness stack 122 is cut into individual capacitor elements 124 of the required shape. The elements 124 are placed into a furnace 126. Extraction of the binder and plasticizer is accomplished at a temperature of about 200–500C in vacuum or air, and sintering of the ceramic and metallic powders is accomplished at a temperature of about 1000–1350C in air. After cooling to ambient temperature, assembly is completed by bonding electrically conducting end plates 128 and lead wires 130 to the sintered capacitor element.

The resulting capacitor 132 has a plurality of metallic foils, resulting from the sintering of the tape 110, separated by a plurality of dielectrics, resulting from the sintering of the tape 104. The thickness of the dielectric is determined by the amount of reduction of the tape 104 during fabrication, but may typically be 1–2 micrometers. Since the capacitance of the capacitor increases with decreasing thickness of the dielectric layer, the capacitor 132 has a performance superior to that of other mass-produced capacitors.

Figure 3:
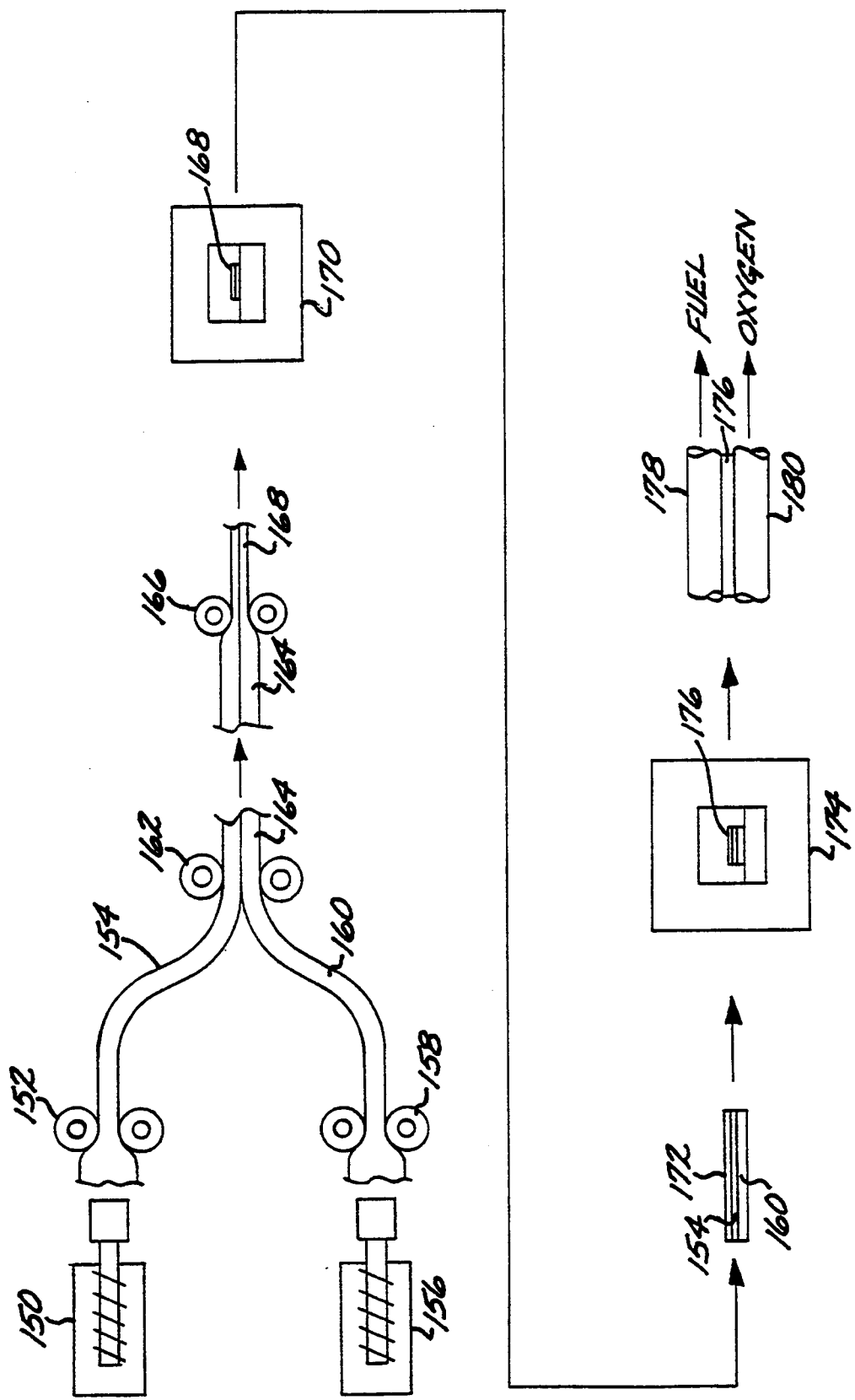
FIG. 3 is a pictorial process flow diagram for the use of the approach of the invention to prepare a solid oxide fuel cell.

FIG. 3 illustrates a process for preparing a solid oxide fuel cell according to the present approach. The operational principles of the solid oxide fuel cell are discussed in U.S. Pat. Nos. 4,816,036 and 4,913,982, whose disclosures are incorporated by reference. Briefly, a fuel such as hydrogen reacts with oxygen ions at the surface of an anode, producing water and electrons in the anode. An oxidizer such as oxygen reacts electrons to form oxygen ions at the surface of a cathode. Electrons flow from the anode through an external load to the cathode, closing the circuit. An electrolyte between the anode and the cathode insulates them electronically from each other, but permits oxygen ions to flow from the cathode to the anode. In one form of the device, the electrolyte is a solid oxide ceramic.

It is desirable in some cases to operate the fuel cell at a relatively low temperature. One technique for reducing the operating temperature of the fuel cell is to make the electrolyte very thin, so that the diffusion path of the oxygen ions is sufficiently short to compensate for the decrease in electrolyte conductivity at relatively low temperature. With conventional manufacturing techniques, such as described in the '036 and '982 patents, the minimum thickness of the electrolyte that can be prepared is about 25 micrometers. It is desirable to make the electrolyte thinner than about 10 micrometers, and most preferably about 2–5 micrometers, in thickness.

Referring to FIG. 3, in a preferred approach a mixture of particles of ceramic powder, preferably yttria-stabilized zirconia, about 20–30 volume percent of a binder, and about 20–30 volume percent of a plasticizer, is prepared in a mixer 150. The mixture is passed between a pair of rollers 152 to form a tape 154 that eventually becomes the electrolyte of the fuel cell. In a second mixer 156, a mixture of particles of another ceramic powder, preferably a mixture of zirconium oxide and nickel oxide that eventually becomes the anode of the fuel cell, about 20–30 volume percent of a binder, and about 20–30 volume percent of a plasticizer, is prepared. The mixture is passed between a pair of rollers 158 to form a tape 160. The electrolyte tape 154 and the anode tape 160 may be of the same or different thicknesses.

The tapes 154 and 160 are laminated together by passing them between two rollers 162, producing a composite tape 164. The rollers 162 may reduce the thicknesses of the individual tapes 154 and 160 as necessary to reach the required final thicknesses.

The composite tape 164 is passed between two rollers 166, or a series of rollers, that reduce the thickness of the composite tape 164 to form a reduced-thickness composite tape 168. The lamination and rolling can be repeated as necessary, and with any combination of stacked structures as may be necessary, to produce a tape 168 with the desired thickness. The stacked elements may be laminates that were previously reduced, tapes, or other planar structures that might be desired in the fuel cell. In this reduced thickness composite tape, the electrolyte tape 154 preferably has a thickness of about 2–5 micrometers. The reduced thickness composite tape 168 is heated in a furnace 170 to a temperature of about 200–500C to extract the binder and plasticizer from the tapes 154 and 160. The temperature is increased to about 1300–1400C to sinter the ceramics in the tapes 154 and 160.

After cooling to room temperature, a layer of a cathodic material 172 in the form of a slurry is painted to the side of the electrolyte material not contacting the anode. The preferred cathodic slurry is formed of doped lanthanum manganite powder particles in a carrier fluid. The previously sintered electrolyte/anode combination and the cathodic slurry painted thereon are placed into a furnace 174, and the temperature is increased to about 1000–1900C to drive off the carrier fluid and to sinter the particles of cathodic material. The resulting anode/electrolyte/cathode structure 176 is assembled with a fuel manifold 178 contacting the anode and an oxidizer manifold 180 contacting the cathode, to form a fuel cell 182. The depicted arrangement for the manifolds 178 and 180 is schematic in nature, and in a practical application more efficient arrangements of the components, such as shown in the '036 and '982 patents, would most likely be used.

The resulting solid oxide fuel cell 182 has an electrolyte layer that is thinner than previously available, less than about 10 micrometers and preferably about 2–5 micrometers in thickness. It can therefore be operated at lower temperature than can other fuel cells having a comparable structure but thicker electrolyte, or it can be operated more efficiently than previously possible at higher temperatures.

Another application of the present invention is the preparation of the electrolyte for an electrochemical storage cell that utilizes a solid electrolyte, a liquid anode, and a liquid cathode. An important example of such a storage cell is the sodium-sulfur cell, wherein sodium is the anode, sulfur is the cathode, and the electrolyte is beta' (beta prime) or beta" (beta double prime) aluminum oxide. The latter is preferred, and in a preferred formulation has a composition of about 90.4 weight percent aluminum oxide, 8.85 weight percent sodium oxide, and 0.75 percent lithium oxide. In the traditional form of the sodium-sulfur cell, the electrolyte is in the form of a hollow cylinder with molten sodium within the interior of the cylinder and molten sulfur on the exterior of the cylinder. Sodium ions diffuse through the electrolyte during charging and discharging of the cell.

In another form of the sodium-sulfur cell, the bipolar cell design, the electrolyte is a flat plate of the beta' or beta" aluminum oxide, with sodium on one side and sulfur on the other side of the electrolyte. This design is described in U.S. Pat. No. 5,053,294, whose disclosure is incorporated by reference. The electrolyte is typically prepared by isostatic pressing of powders of the required compositions, followed by machining. The thickness of the electrolyte prepared by the conventional approach is typically about 450 micrometers.

The electrolyte is the most electrically resistive of the elements of the sodium-sulfur electrochemical storage cell. If the electrolyte could be made thinner, it would reduce the resistance of the cell and improve the charging and discharging performance of the cell. The present invention provides a method for preparing such a thinner electrolyte.

Figure 4:
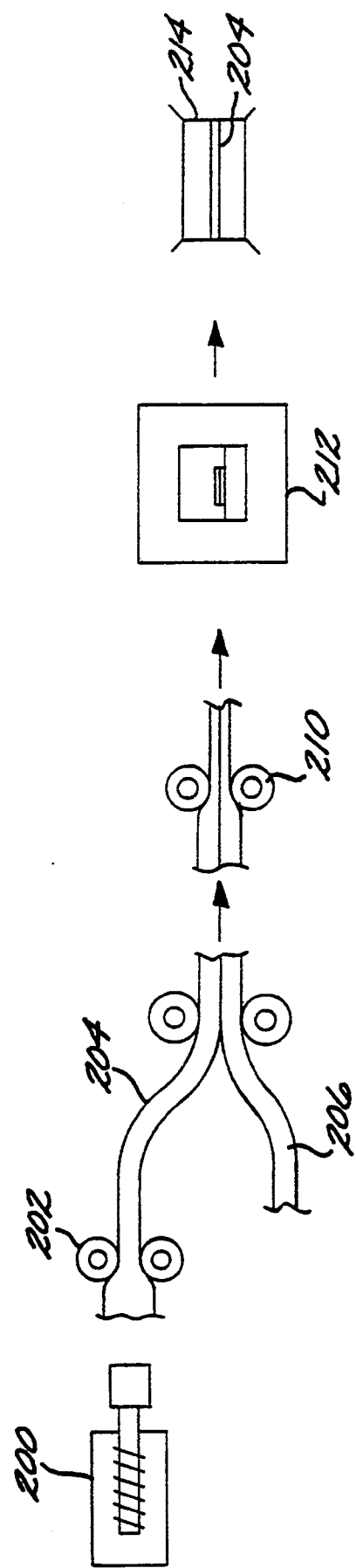
FIG. 4 is a pictorial process flow diagram for the use of the approach of the invention to prepare an electrolyte for a sodium-sulfur electrochemical storage cell.

In a preferred method for preparing the electrolyte according to the present invention, illustrated in FIG. 4, a mixture of particles of ceramic powder, preferably the beta" aluminum oxide composition described above, preferably about 20-30 volume percent of a binder, and about 20-30 volume percent of a plasticizer, is prepared in a mixer 200. The mixture is passed between a pair of rollers 202 to form a tape 204 that eventually becomes the electrolyte of the storage cell. The tape 204 and a second tape 206 are passed through a pair of rollers 208 to laminate the two tapes 204 and 206 together. The second tape 206 may be a ceramic-containing tape material that is processed along with the electrolyte tape 204 and eventually becomes a part of the electrochemical cell. Such a tape 206 is highly porous in its final form, and provides a mechanical support for the electrolyte within the electrochemical cell while permitting interdiffusion of ions. An example of the composition of such a tape 206 is beta" aluminum oxide or titanium oxide.

After lamination, the laminated tapes 204/206 are passed through a pair of rollers 210 that reduces the thickness of the laminate to a preselected value. This lamination and rolling process can be repeated as necessary, and with various stacked elements as necessary, until a desired thickness of the electrolyte tape 204, supported on the tape 206, is obtained. The stacked elements may be laminates that were previously reduced, tapes, or other planar structures that might be desired in the cell.

The laminate of reduced thickness is heated in a furnace 212 to extract the binder and plasticizer from the tape 204. After the volatile components are extracted, the temperature of the furnace is increased to about 1400-1700C to sinter the beta" aluminum oxide of the electrolyte tape 204 and the ceramic of the second tape 206.

The electrolyte tape 204, now in sintered form, is assembled with other electrode support structure, an alpha aluminum oxide housing, and metallic end plates, and sealed with glass seals, as described in the '294 patent, to form the sodium-sulfur cell 214. Sodium and sulfur are loaded into the two sides of the cell 214 before it is sealed.

The present Invention provides an approach for preparing thin ceramic layers or tapes for use in a wide variety of devices. The thin ceramic layers can be manufactured economically and in large quantities required for device fabrication. The thin ceramic layers in some cases can improve the performance of the devices to levels not previously attained. This invention has been described in connection with specific embodiments and examples. However, It will be readily recognized by those skilled in the art that there are various modifications and variations of which the present invention is capable within the scope of the appended claims.

What is claimed is:

1. A method for preparing a multilayer capacitor, comprising the steps of:
   forming a ceramic/metal composite by the steps of
      preparing a ceramic mixture of ceramic particles, a first binder, and a first plasticizer,
      forming the ceramic mixture into a ceramic dielectric layer,
      preparing a metallic mixture of metallic particles, a second binder, and a second plasticizer,
      forming the metallic mixture into a metallic layer, and
      laminating the ceramic dielectric layer to the metallic layer to form the ceramic/metal composite;
   stacking at least two of the ceramic/metal composites together to form a stack;
   reducing the thickness of the stack until the thickness of the ceramic dielectric layer is reduced to a preselected value;
   further stacking at least two of the stacks together;
   reducing the thickness of the stacks prepared in the step of further stacking until the thickness of the ceramic dielectric layer is reduced to a second preselected value; and
   assembling the stack produced in the step of reducing the thickness of the stacks prepared in the step of further stacking into a capacitor structure.

2. The method of claim 1, including the additional step of
   repeating the steps of further stacking and reducing the thickness of the stacks until the thickness of the ceramic dielectric layer is reduced to a third preselected value.

3. The method of claim 1, including the additional step, after the step of reducing, of
   sintering the ceramic dielectric layers and the metallic layers.

4. A method for preparing a multilayer capacitor, comprising the steps of:
   forming a ceramic/metal composite by the steps of
      preparing a ceramic mixture of ceramic particles, a first binder, and a first plasticizer,
      forming the ceramic mixture into a ceramic dielectric layer, preparing a metallic mixture of metallic particles, a second binder, and a second plasticizer, forming the metallic mixture into a metallic layer, and laminating the ceramic dielectric layer to the metallic layer to form the ceramic/metal composite;

stacking at least two of the ceramic/metal composites together to form a stack;

reducing the thickness of the stack until the thickness of the ceramic dielectric layer is reduced to a preselected value, wherein the steps of forming the ceramic mixture, forming the metallic mixture, laminating, and reducing the thickness are performed by passing the respective materials between rolls; and assembling the stack produced in the step of reducing the thickness into a capacitor structure.

5. A method for preparing a solid oxide fuel cell, comprising the steps of:

preparing a first ceramic mixture of first ceramic particles, a first binder, and a first plasticizer;

forming the first ceramic mixture into a ceramic electrolyte layer;

preparing a second ceramic mixture of second ceramic particles, a second binder, and a second plasticizer;

forming the second ceramic mixture into a ceramic first electrode layer;

laminating the ceramic electrolyte layer to the ceramic first electrode layer to produce a laminated structure;

reducing the thickness of the laminated structure until the thickness of the ceramic electrolyte layer is reduced to a preselected value;

laminating the laminated structure with another structure to form a secondary laminated structure;

reducing the thickness of the secondary laminated structure; and assembling the laminated structure produced in the step of reducing the thickness of the secondary laminated structure into a solid oxide fuel cell.

6. The method of claim 5, wherein the steps of forming the first ceramic mixture, forming the second ceramic mixture, laminating, and reducing the thickness are performed by passing the respective materials between rolls.

7. A method for preparing a solid oxide fuel cell, comprising the steps of:

preparing a first ceramic mixture of first ceramic particles, a first binder, and a first plasticizer;

forming the first ceramic mixture into a ceramic electrolyte layer;

preparing a second ceramic mixture of second ceramic particles, a second binder, and a second plasticizer;

forming the second ceramic mixture into a ceramic first electrode layer;

laminating the ceramic electrolyte layer to the ceramic first electrode layer to produce a laminated structure;

reducing the thickness of the laminated structure until the thickness of the ceramic electrolyte layer is reduced to a preselected value; and assembling the laminated structure produced in the step of reducing the thickness into a solid oxide fuel cell, the step of assembling including the steps of sintering the laminated structure of reduced thickness, applying a layer of third ceramic particles to the ceramic electrolyte layer side of the laminated structure, the layer of third ceramic particles to serve as a second electrode, and sintering the structure produced in the step of applying.

* * * * *